No. 755,094. PATENTED MAR. 22, 1904.
W. WRIGHT.
FEED WATER HEATER.
APPLICATION FILED OCT. 25, 1901.
NO MODEL.
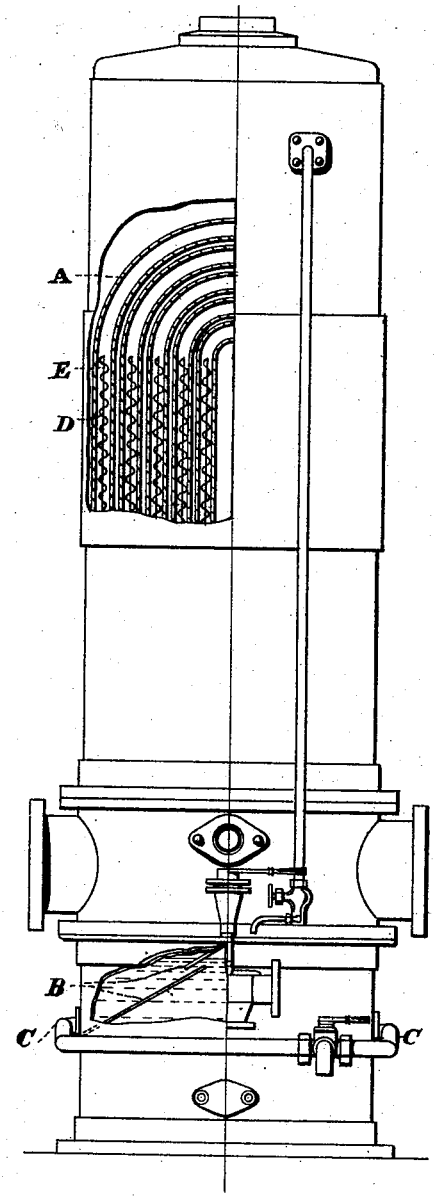
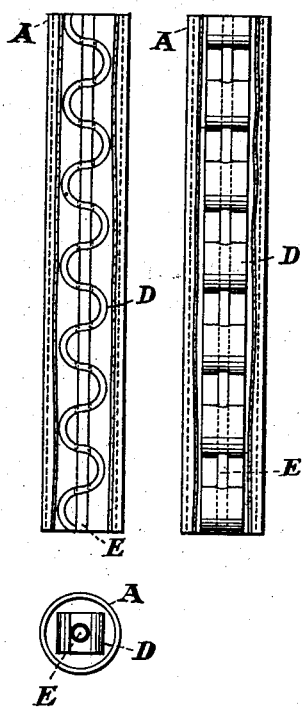
WITNESSES:
Isabella Waldron
Adelaide Claire Gleason
INVENTOR.
William Wright
BY
Richardson
ATTORNEYS No. 755,094. Patented March 22, 1904.

UNITED STATES PATENT OFFICE.

WILLIAM WRIGHT, OF NEW WANDSWORTH, ENGLAND, ASSIGNOR OF ONE-HALF TO DAVID CREWE, OF PAHIATUA, WELLINGTON, NEW ZEALAND.

FEED-WATER HEATER.

SPECIFICATION forming part of Letters Patent No. 755,094, dated March 22, 1904.

Application filed October 25, 1901. Serial No. 79,931. (No model.)

*To all whom it may concern:*

Be it known that I, WILLIAM WRIGHT, a subject of the King of Great Britain, residing at New Wandsworth, England, have invented certain new and useful Improvements in Feed-Water Heaters or Condensers, of which the following is a specification.

The object of this invention is to improve the power and more satisfactory working of feed-water heaters or condensers and any other heating or cooling apparatus and provide durable and efficient heating, condensing, or cooling and separating within a comparatively small space and with a small amount of tube-surface, interspersing or deflecting plates being so disposed as to break up the currents of steam, gas, or air or other fluids, whether for heating or cooling, so as to cause better contact between such steam, air, or gas and other fluids and the condensation or heating surface and more rapid transfer of heat. For these purposes I make use of corrugated strips or plates, with or without a center tube or rod of metal or any other suitable material, such strips or plates being inserted in the tube or tubes, thereby causing the steam, air, gas, and other fluids to impinge against the surface of the tubes and so prevent any central core of steam, air, or gas and other fluids from passing through the tubes without having contact with them, the agitation being effectively maintained by the plates or strips during its passage. The cooling fluid or fluids to be heated are preferably passed around the outside of the tubes or inside when circumstances require it. The tubes, which are preferably in their true round form, maintain their full strength and power, which is desirable for large pressures; but tubes of any section may be used to suit circumstances. I also supply a grease-separating arrangement to extract the greasy matter from the condensed-steam water in the bottom or tank of the heater, which allows said grease and water to be used over again. I use coned plates fixed inside the bottom tank rising from the sides to the center or from the center to the sides just below the level of the overflow-pipe, and at the bottom of the coned plates a valve or valves are fixed for drawing off the greasy matter, instead of allowing it to pass away mixed with the condensed-steam water. The steam and other connections are of any usual or suitable kind.

I will now describe my invention with reference to the accompanying drawings, in which—

Figure 1 is a vertical elevation, partly in section, of my apparatus as applied to the Berryman feed-water heater or condenser or any other heating, cooling, or condensing apparatus, either vertical or in any other position. Fig. 2 is an enlarged sectional elevation and plan of one of the tubes with my corrugated strip or plate fixed in position and shown edgewise in the elevation. Fig. 3 is a front view of the strip in position, with part of the pipe removed.

A shows the tubes with the deflectors fixed in them.

B shows the grease-separating plates or cones.

C C show a pipe and valve for drawing the greasy matter from the bottom part of the heater.

D shows the corrugated interspersing or deflecting strip.

E shows the rod or tube passing through the strips D.

It may be noted that the corrugations may be altered or varied in shape or size to suit any circumstances that may arise without departing from the invention or its purposes.

I claim—

In combination with a water-heater, a tube for the passage of the water and a strip, extending through the said tube, of wave-like form, said strip being out of contact with the tube at the apices of the wave-like portions, substantially as described.

In witness whereof I have hereunto set my hand in presence of two witnesses.

WILLIAM WRIGHT.

Witnesses:
S. S. BROMHEAD,
HENRY FAIRBROTHER.